Patented July 12, 1949

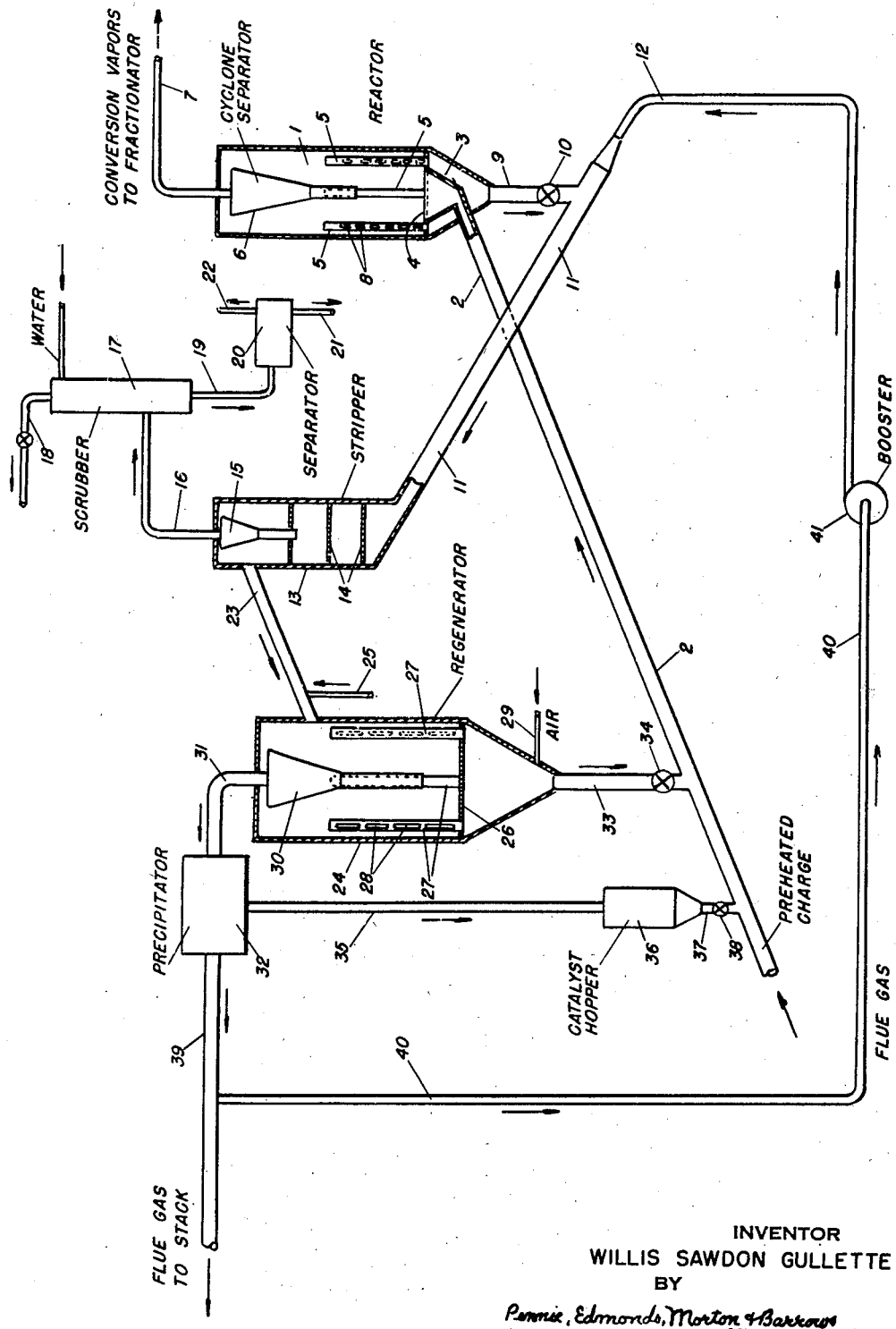

2,476,144

UNITED STATES PATENT OFFICE 2,476,144

PYROLYTIC CONVERSION OF HYDROCARBONS WITH THE AID OF A FLUIDIZED CATALYST

Willis S. Gullette, Highland, Ind., assignor to Sinclair Refining Company, New York, N. Y., a corporation of Maine Application April 30, 1947, Serial No. 745,047

3 Claims. (Cl. 196—52)

This invention relates to the pyrolytic conversion of hydrocarbons and, more particularly, to pyrolytic conversion processes involving the use of finely divided catalyst.

The invention is especially applicable to conversion processes of the general type wherein a suspension of finely divided catalyst in oil vapors, at an elevated temperature, is passed to a reactor in which conversion of the oil occurs and in which the spent catalyst is separated from the oil vapors, the separated catalyst stripped of oil, regenerated and the regenerated catalyst again suspended in the stream of oil vapors passing to the reactor.

Operations of the type described are commonly designated fluid catalyst processes. In conventional operation, the spent catalyst from the stripping zone is conveyed, in suspension in a gaseous medium, to a regenerating zone in which the carbon deposited on the catalyst particles is burned off by contact with air and the regenerated catalyst in fluid suspension is returned to the reaction zone.

An important consideration in operations of this type, from a practical aspect, is the utilization of the catalyst to the fullest extent possible. For maximum efficiency, it is desirable that all of the catalyst be utilized to an equal extent in the reaction zone and passed to the regenerator and that, in the regenerator, all the catalyst be uniformly regenerated and returned to the reaction zone.

In operations of this type, the catalyst is usually maintained throughout the operation in a fluidized, i. e., a free-flowing condition. However, the catalyst is normally not of uniform density throughout the various stages of the operation.

In the reactor, for instance, there is a relatively dense phase body of the catalyst which is kept fluidized by the hydrocarbon vapors passing therethrough and from which the spent catalyst is withdrawn for regeneration. A similar dense phase body of the catalyst is maintained in the regenerator, from which regenerated catalyst is withdrawn and returned to the reactor. In both the reaction zone and the regenerating zone, there is normally this so-called "high density" or "dense phase" body of catalyst above which the catalyst, in relatively low concentration, is suspended in the ascending gases, or vapors.

The particles of the catalyst vary considerably in size and there is a tendency for the larger particles to gravitate to the lower portion of the dense phase body of catalyst in the reaction zone and in the regenerating zone and for the smaller particles to be carried to the upper portion of the dense phase body of the catalyst.

By reason of this tendency toward stratification, the larger particles of the catalyst are normally more rapidly circulated through the system than are the smaller particles. Frequently, a large proportion of the smaller particles of the catalyst is carried off from the regenerator with the effluent gases to the precipitator from which it is normally returned to the regenerating zone, and frequently is repeatedly recycled between the regenerator and precipitator and subjected to a greater period of time than desirable in the regenerating zone instead of being returned to the reactor. At the same time, larger particles of the catalyst may be too rapidly removed from the regenerating zone before they have been completely regenerated. A similar condition exists in the reactor.

In my copending application Ser. No. 745,046 filed concurrently, herewith, I have disclosed and claimed an improved method of operation whereby the lack of uniformity of circulation of the catalyst through the system is, to a major extent, avoided. In accordance with the process there described, the catalyst is uniformly withdrawn for recirculation from the reaction zone to the regenerating zone, and from the regenerating zone back to the reaction zone, respectively, from over substantially the entire depth of the above described high density of dense phase body of the catalyst.

The present invention constitutes an improvement in the method of operation described in my above noted application and provides a method of operation whereby further improvement in the uniformity of catalyst circulation through the system is attained, particularly with respect to the fines or finely divided particles of catalyst carried off from the regenerator in suspension in the effluent flue gases.

These fines are, to some extent, present in the catalyst initially charged to the system. Further, fines accumulated in the system as a result of attrition of the catalyst during operation. The accumulation of these fines in the system has usually been considered objectionable because of lack of uniformity of circulation through the system due to their recycling between the precipitator and the regenerator without passing to the reactor.

In accordance with my present invention, the difficulty heretofore experienced in the utilizing of fines is, to a major extent, avoided by passing the fines directly from the precipitator, in which they are recovered from the regenerator flue gases, directly to the reactor feed line, in which they are suspended in the charge oil and positively returned to the reaction zone where they are effectively utilized in promoting the hydrocarbon conversion.

The accumulation of these fines in the reaction zone is avoided by my previously described method of uniformly withdrawing spent catalyst from the reactor from over substantially the entire height of the dense phase body. By the joint use of my direct return of the fines to the reaction zone and the uniform withdrawal of spent catalyst from the reaction zone, the fines are effectively recycled and continuously utilized in the system.

The invention will be more fully described and illustrated by reference to the accompanying drawing which represents conventionally and diagrammatically a flow diagram of a fluid catalyst cracking operation embodying my invention.

The apparatus illustrated by the reference numeral 1 (of Fig. 1) of the drawing represents a generally cylindrical reactor. The finely divided catalyst suspended in oil vapors enters the reactor through the conduit 2 extending into the reactor and terminating in a conical member 3 of somewhat smaller maximum diameter than that of the reactor. Just above the conical member 3, there is positioned a plate 4, perforated at its central portion over a diameter equal to the maximum diameter of the conical member 3 and otherwise imperforate except for four openings through the plate spaced 90° apart from which there extend upwardly four risers or standpipes 5.

As the hot oil vapors pass upwardly through the reactor there is a tendency for the catalyst to drop out of suspension and gravitate downwardly through the reaction zone forming the "high density" or "dense phase" body of catalyst, as previously described.

The oil vapors, product of the conversion, rise to the top of the reactor, pass through a cyclone separator 6, to remove suspended catalyst from the vapors, the latter passing therefrom through conduit 7 to fractionating apparatus, not shown, and the separated catalyst dropping back into the reactor to a zone thereof below the upper surface of the high density body of catalyst.

Each of the standpipes 5 is provided with slots or other openings 8 in opposite sides thereof, preferably placed at 90° to the radius of the reactor running through the center of the standpipe. These standpipes 5 are preferably of such height as to extend well above the top level of the so-called dense phase. The slots should be spaced along the entire height of the standpipes, or at least to a height equal to that of the dense phase body of the catalyst. The area of the slots should be such that the summation of their area does not greatly exceed that of the transverse sectional area of the vertical passage through the respective standpipes.

Instead of a plurality of openings 8 placed along the height of the respective standpipes, each standpipe may be provided with a slot on opposite sides thereof, extending the entire height of the standpipe.

In order further to regulate the flow of the catalyst into the respective standpipes, the slot may be of V-shape, being larger at its upper end. Further, the areas of the respective openings 8 may be progressively larger from bottom to top for the same reason. By this arrangement, the less dense catalyst from the upper portion of the bed is permitted freer access to the standpipe than is the more dense catalyst at the lower portion of the bed.

The spent catalyst passing downwardly through the standpipes 5 flows into the conical lower portion of the reactor and passes downwardly through spent catalyst leg 9, in which there is interposed a valve arrangement 10, advantageously of the double slide valve type, and into conduit 11 where it is caught up by a current of stripping medium introduced through line 12 and carried up into the bottom of stripper 13.

The stripping medium introduced through line 12 may be steam, for instance, but in the operation shown, the stripping medium is hot flue gases from the regenerator presently to be described. The spent catalyst leg 9 is, advantageously, of sufficient length to form an effective seal against the upward passage of stripping medium into the reactor.

Oil is partially stripped from the catalyst in transit to the stripper and further stripping is thereafter effected in the stripper. The stripper 13 is provided with a plurality of baffles or perforated plates 14 adapted to retard the passage of catalyst upwardly through the stripper and to promote uniform and prolonged contact between the catalyst and the stripping medium supplied through line 12.

Gaseous products pass from the top of the stripper through a cyclone type separator 15, for the separation of suspended catalyst, and out through conduit 16 to scrubber 17. In the scrubber, the stripping medium admixed with vapors of oil stripped from the spent catalyst are scrubbed with a scrubbing menstruum, for instance, water or oil, to separate valuable hydrocarbons from the incondensible gases. The scrubbed gases pass out through conduit 18 and the scrubbing menstruum and absorbed hydrocarbons pass through line 19 to a separator, diagrammatically represented at 20, from which the menstruum passes through line 21 and the hydrocarbons pass off through line 22 and may be returned for retreatment or passed to storage.

The hot stripping medium passing upward through the stripper, strips from the catalyst the major portion of vaporizable hydrocarbons contained therein and carries the catalyst gradually upwardly through the stripper. A relatively dense bed of the catalyst accumulates in the stripper and overflows through conduit 23 to the upper portion of the regenerator 24. A small amount of stripping medium, steam or flue gases, for instance, may be introduced into the lower end of conduit 23 through line 25 for the purpose of maintaining the catalyst in a fluid condition and also further to strip from the catalyst any residual oil or vapors.

The regenerator shown is of a cylindrical type, quite similar to the reactor, just described, except that the catalyst inlet conduit leads to the upper portion of the regenerator.

Positioned in the lower portion of the regenerator, just above the cone shaped bottom of the regenerator, is a plate 26, perforated at its center portion and otherwise imperforate except for four openings therethrough spaced 90° apart, each opening connecting the lower conical portion of the regenerator with an upwardly projecting standpipe 27 similar to the standpipes 5 of the reactor. As in the reactor, these standpipes extend upwardly to a point preferably well above the top level of the so-called dense phase of the body of catalyst in the regenerator and are similarly equipped with openings 28 spaced or extending along its height for withdrawing catalyst from the catalyst bed. These openings 28 are shown in the drawing as rectangular slots. It will be understood, however, that the side openings in standpipes 27, and also those in standpipes 5, may be either round or rectangular or may extend the entire height of standpipe, the size of the opening being either parallel or forming a V-shaped slot. It is desirable, however, that the summation of the areas of the openings in any one standpipe not greatly exceed the cross-sectional air of the vertical passage extending through the standpipe.

Upon contact of the air with the hot catalyst, the coke or carbon deposited on the catalyst is burned as the catalyst gravitates gradually downwardly through the regenerator, air being introduced in the lower portion of the regenerator through line 29.

The air and products of combustion passing upwardly through the regenerator tend to carry the smaller particles of catalyst along in suspension and maintains the bed in a fluid condition.

The products of combustion pass from the upper portion of the regenerator through cyclone separator 30 for the separation of a portion of the catalyst remaining in suspension in the flue gases. The separated catalyst is returned to a point in the regenerator below the upper surface of the dense phase of the body of catalyst and the products of combustion carrying catalyst fines in suspension pass through conduit 31 to a precipitator of conventional type, for instance, an electrical precipitator, diagrammatically represented on the drawing at 32.

The regenerated catalyst is withdrawn through standpipes 27 from zones spaced or extending along the entire height of the catalyst bed, and passed by gravity into the lower conical portion of the regenerator and out through regenerated catalyst leg 33 into the lower end of conduit 2 where it is caught up by a stream of preheated charge oil and returned to the reactor, as previously described. The regenerated catalyst leg is provided with a valve arrangement 34, advantageously of the double slide valve type, for controlling the passage of catalyst from the regenerator, and the leg is advantageously of sufficient length to form an effective seal against the upward passage of charge oil to the regenerator.

The precipitated fines are passed from the precipitator 32 through conduit 35 into hopper 36 and from the hopper through conduit 37, controlled by valve 38, into the lower end of the reactor feed line 2 and carried along by the charge oil, together with the catalyst from the regenerated catalyst leg, directly to the reactor.

A portion of the flue gases passing from the precipitator through line 39 is diverted through line 40 by means of booster 41 and passed through line 12 into the lower end of conduit 11, as previously described.

The catalyst employed may be of the type conventionally used in fluid catalyst processes, for instance, a silica-alumina type catalyst in finely divided or powdered form. The reaction conditions may, likewise, be those conventionally used in operations of this type and, as understood by the art, the optimum temperatures and pressures will depend primarily upon the type of feed stock used, the particular catalyst employed, and the reaction desired.

In cracking gas oil, for instance, the reaction temperature may, with advantage, be within the range of about 800° to 1,000° F. and the pressure at the top of the reactor within the range of about 5 to 25 pounds per square inch. The regeneration temperature may be within the range of about 950° to 1,200° F. The flue gases passing from the regenerator will usually be under a pressure of about 5 to 15 pounds per square inch and this pressure is, with advantage, boosted to, say, 25 pounds per square inch or higher by the booster.

It will be understood that the present invention is not restricted to the particular embodiment herein described, but is applicable to various modifications of fluid catalyst processes.

Further, it will be understood that the term gaseous medium is used in the appended claims to designate the medium to be brought into contact with the catalyst and, in addition to true gases, is intended to include vapors.

I claim:

1. In the fluid catalyst process for the conversion of hydrocarbons, in which the hydrocarbon in vapor phase is passed upwardly through a relatively dense fluidized body of the catalyst in a reaction zone, spent catalyst is withdrawn from the reaction zone, stripped of oil, regenerated by passing a stream of gaseous regenerating medium in contact therewith, regenerated catalyst is returned to the reaction zone, and residual catalyst fines passed from the regenerating zone in suspension in effluent gases, the improvement which comprises uniformly withdrawing the catalyst for regeneration from throughout the height of the relatively dense body of the catalyst in the reaction zone, separating the residual catalyst fines from the effluent gases from the regenerating zone and positively returning the separated fines directly to the reaction zone.

2. In the fluid catalyst process for the conversion of hydrocarbons in which the hydrocarbon in vapor phase is passed upwardly through a relatively dense fluidized body of the catalyst in a reaction zone, spent catalyst is withdrawn from the reaction zone, stripped of oil, passed to a regenerating zone and regenerated therein by passing a gaseous regenerating medium upwardly through a relatively dense fluidized body of the catalyst from which regenerated catalyst is withdrawn and returned to the reaction zone and residual catalyst fines pass off from the regenerating zone in suspension in effluent gases, the improvement which comprises uniformly withdrawing catalyst for recirculation from throughout the height of the respective relatively dense fluidized bodies of the catalyst, separating residual catalyst fines from the effluent gases from the regenerating zone and positively returning the separated fines directly to the reaction zone.

3. In the fluid catalyst process for the conversion of hydrocarbons wherein a finely divided solid catalyst suspended in charge oil is passed to a reaction zone, wherein a dense phase fluidized body of the catalyst is formed and the charge oil is passed in vapor phase upwardly through the body of catalyst, spent catalyst is withdrawn from the reaction zone, stripped of oil and regenerated in a regenerating zone by passing a stream of regenerating gases in contact therewith, regenerated catalyst is returned to the reaction zone and residual catalyst fines passed from the regenerating zone in suspension in effluent gases, the steps of continuously withdrawing catalyst for regeneration from the dense phase body of catalyst in the reaction zone from a plurality of points uniformly spaced along its height, separating the residual catalyst fines from the effluent gases from the regenerator and positively returning the separated fines directly to the reaction zone.

WILLIS S. GULLETTE.

REFERENCES CITED

The following references are of record in the file of this patent:

UNITED STATES PATENTS

| Number | Name | Date |
|---|---|---|
| 2,334,553 | Harding | Nov. 16, 1943 |
| 2,378,542 | Edmister | June 19, 1945 |
| 2,391,334 | Nicholson | Dec. 18, 1945 |
| 2,408,943 | Mekler | Oct. 8, 1946 |